Aug. 9, 1960   P. FROST ET AL   2,948,259

POINTER ARRANGEMENT FOR METERS

Filed March 27, 1958

INVENTORS
Paul Frost, Willy Kaden
BY Michael S. STRIKER
Attorney

United States Patent Office
2,948,259
Patented Aug. 9, 1960

2,948,259

POINTER ARRANGEMENT FOR METERS

Paul Frost and Willy Kaden, Munich, Germany, assignors to Agfa Aktiengesellschaft, Leverkusen, Germany Filed Mar. 27, 1958, Ser. No. 724,344

Claims priority, application Germany Apr. 2, 1957

4 Claims. (Cl. 116—136.5)

The present invention relates to meters, such as exposure meters used in photography.

With such meters it is often necessary to align one pointer manually with another pointer which is moved automatically by the meter, and because of lack of precision in the alignment of these pointers there is a lack of precision in the information derived from the meter.

One of the objects of the present invention is to provide in a meter of the above type a pointer construction which will guarantee precise alignment of the pointers.

Another object of the present invention is to provide a pointer arrangement making it possible to provide precise alignment of a pair of pointers simply by looking at the pointers.

A further object of the present invention is to provide a simple rugged structure capable of accomplishing the above objects.

With the above objects in view the present invention includes, for use in a meter such as an exposure meter, a pointer having a free indicating end portion provided with a pair of legs spaced from each other and respectively terminating at the extreme end of the pointer in a pair of leg portions which are directed toward each other and which terminate respectively in extremities defining a predetermined gap between themselves.

Figure 1:
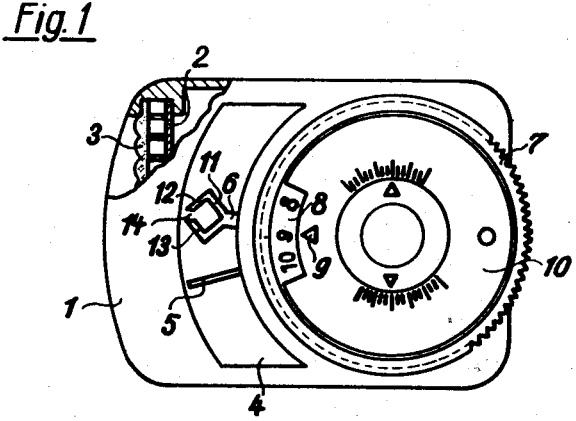
Figure 2:
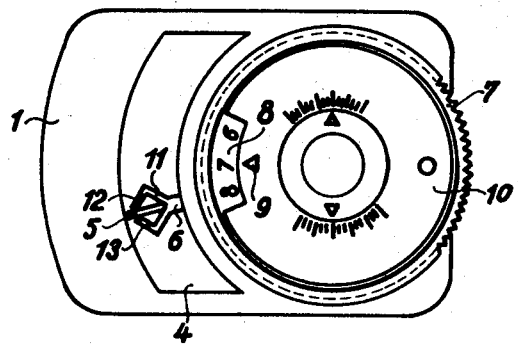

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 illustrates, partly in section, an exposure meter having a pointer arrangement according to the present invention, and the pointers being shown in Fig. 1 out of alignment with each other; and Fig. 2 shows the structure of Fig. 1 with the pointers in alignment with each other.

Referring now to the drawings, there is shown therein the housing 1 of a photoelectric exposure meter, and Fig. 1 fragmentarily illustrates in section the photocell 2 of the meter as well as the member 3 through which the light passes to the photocell, this member 3 having a lenticulated exterior surface, as is well known. The pointer 5 of the unillustrated measuring instrument located in the housing 1 is visible through the window 4 of the housing, and a manually movable pointer 6 constructed according to the present invention has its free indicating end portion also visible in the window 4. The pointer 5 is moved automatically by the instrument, and then the pointer 6 is manually moved into alignment with the pointer 5 so as to indicate the desired information. This pointer 6 is connected through an unillustrated linearizing drive with the knurled ring 7 which carries a scale 8 so as to be turned about the same turning axis as the pointer 5 when the ring 7 is manually turned. A disc 10 is concentrically located over the ring 7 and is independently adjustable and carries scales, this disc 10 also carrying an index 9 cooperating with the scale 8 of the ring 7. This scale 8 indicates light values, and the desired information is obtained when the pointer 6 is manually aligned with the pointer 5.

The free indicating end portion of the pointer 6 includes a pair of spaced legs 11 of substantially V-shaped configuration respectively terminating in a pair of end portions 12 and 13 whose extremities at the extreme end of the pointer 6 are spaced from each other to define between themselves the gap 14 of predetermined width, these leg end portions 12 and 13 extending toward each other. Thus, the legs 11 provide the free indicating end portion of the pointer 6 with substantially the configuration of a hollow rhombus which is open at one corner where the gap 14 is located. The width of the gap 14 is approximately equal to the width of the pointer 5. Preferably, this gap 14 is slightly wider than the pointer 5.

In the illustrated example the turning plane of the pointer 5 is parallel to and located just beneath the turning plane of the coaxial pointer 6, and proper alignment is obtained when the ring 7 is turned so as to locate the gap 14 directly over the pointer 5, giving the impression when looking at the aligned pointers that the tips of the leg portions 12 and 13 almost touch the side edges of the galvanometer pointer 5, respectively, as indicated in Fig. 2. In this way the structure of the invention provides an extremely simple and at the same time highly accurate alignment of the pointers.

Of course, the bifurcated end portion of the pointer 6 may take other forms. For example, instead of having substantially the configuration of a rhombus, the legs at the free indicating end of the pointer may have substantially the configuration of a heart-shaped frame open at its top to provide the desired gap, or the ends of the legs 11 which are connected with the remainder of the pointer 6 may form part of a member of substantially U-shaped configuration, for example. Also, the plane in which the pointer 5 turns may be located above the plane in which the pointer 6 turns, instead of beneath this latter plane as described above.

It will be understood that each of the elements described above, or two or more together, may also find a useful aplication in other types of meters differing from the types described above.

While the invention has been illustrated and described as embodied in meter pointers, it is not intended to be limited to the details shown, since various modifications and structural changes may be made without departing in any way from the spirit of the preesnt invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use in a meter such as an exposure meter, in combination, a first pointer moved automatically by the meter; and a second pointer moved manually by the operator to a position aligned with said first pointer with one of said pointers overlying the other pointer for indicating certain informaton to the operator, said second pointer having a free end provided with a pair of legs spaced from each other and respectvely terminating at the extreme end of said second pointer in a pair of leg portions which are directed toward each other and which terminate respectively in extremities defining between themselves a gap having a width approximately equal to the width of said first pointer so that the alignment of the latter with said gap indicates accurate alignment of said pointers.

2. For use in a meter such as an exposure meter, a first pointer moved automatically by the meter; and a second pointer manually movable by the operator to a position aligned with said first pointer with one of said pointers overlying the other pointer for indicating certain information to the operator, said second pointer having a free indicating end portion provided with a pair of substantially V-shaped legs spaced from each other and respectively terminating at the extreme end of the pointer in a pair of leg portions directed toward each other and respectively having extremities spaced from each other, said legs providing said indicating end portion of said pointer substantially with the configuration of a hollow rhombus one corner of which is open at said extremities of said leg portions, said open corner defining a gap approximately equal to the width of said first pointer so that the alignment of the latter with said gap produces precise alignment of both pointers.

3. For use in a meter such as an exposure meter, in combination, a first pointer automatically turned about a predetermined axis by the meter; and a second pointer manually turnable about said axis to a position aligned with said first pointer with one of said pointers overlying the other pointer, said second pointer having a free bifurcated end portion provided with a pair of legs respectively having extreme end portions directed toward and spaced from each other and defining between themselves a gap having a width slightly greater than the width of said first pointer so that the alignment of the latter with said gap produces precise alignment of both pointers.

4. For use in a meter such as an exposure meter, in combination, a first pointer automatically turned about a predetermined axis by the meter; and a second pointer manually turnable about said axis to a position aligned with said first pointer with one of said pointers overlying the other pointer, said second pointer having a free bifurcated end portion provided with a pair of legs respectively having extreme end portions directed toward and spaced from each other and defining between themselves a gap having a width slightly greater than the width of said first pointer so that the alignment of the latter with said gap produces precise alignment of both pointers, said legs providing said second pointer at its free end portion with the configuration of a hollow rhombus which is open at the corner where said gap is located.

References Cited in the file of this patent

UNITED STATES PATENTS

| | | |
|---|---|---|
| 531,669 | Weston | Jan. 1, 1895 |
| 1,397,547 | Reeves | Nov. 22, 1921 |
| 2,532,417 | Norman | Dec. 5, 1950 |
| 2,788,765 | Haynes | Apr. 16, 1957 |

FOREIGN PATENTS

| | | |
|---|---|---|
| 119,513 | Switzerland | Mar. 16, 1927 |